United States Patent
Smith et al.

(10) Patent No.: US 7,171,124 B2
(45) Date of Patent: Jan. 30, 2007

(54) WAVELENGTH ROUTING AND SWITCHING MECHANISM FOR A PHOTONIC TRANSPORT NETWORK

(75) Inventors: Anthony Vernon Walker Smith, Ottawa (CA); Jonathan Titchener, GreenBrook, NJ (US); John Peter Guy, Nepean (CA); Robert Alain Nadon, Ottawa (CA)

(73) Assignee: Lucent Technologies Inc., Murray Hill, NJ (US)

( * ) Notice: Subject to any disclaimer, the term of this patent is extended or adjusted under 35 U.S.C. 154(b) by 489 days.

(21) Appl. No.: 09/909,265

(22) Filed: Jul. 19, 2001

(65) Prior Publication Data

US 2003/0020977 A1 Jan. 30, 2003

(51) Int. Cl.
*H04B 10/08* (2006.01)
*H04B 17/00* (2006.01)
*H04J 14/02* (2006.01)

(52) U.S. Cl. .......................................... 398/97; 398/37
(58) Field of Classification Search ................ 398/175, 398/79, 97, 49, 37
See application file for complete search history.

(56) References Cited

U.S. PATENT DOCUMENTS

2002/0063915 A1* 5/2002 Levandovsky et al. ..... 359/110

OTHER PUBLICATIONS

S. Kim et al, "Regenerator Placement Algorithms for Connection Establishment in All-Optical Networks", IEE Proc-Commun., vol. 148, No. 1, Feb. 2001.*
D. Banerjee et al., "A Practical Approach for Routing and Wavelength Assignment in Large Wavelength-Routed Optical Networks", IEEE Journal of Selected Areas in Communications, vol. 14, No. 5, Jun. 1996.*
A. Jukan et al., "Service-Specific Resource Allocation in WDM Networks with Quality Constraints", IEEE Journal on Selected Areas in Communications, vol. 18, No. 10, Oct. 2000.*
R. Ramaswami et al., Design of Logical Topologies for Wavelength-Routed Optical Networks, IEEE Journal of Selected Areas in Communications, vol. 14, No. 5, Jun. 1996.*
Z. Zhang et al., A Heuristic Wavelength Assignment Algorithm for Multihop WDM Networks with Wavelength Routing and Wavelength Re-Use, IEEE/ACM Transactions on Networking, vol. 3, No. 3, Jun. 1995.*
A. Mokhtar et al., "Adaptive Techniques for Routing and Wavelength Assignment in All-Optical WANs", IEEE 1997.*

* cited by examiner

*Primary Examiner*—Shi K. Li

(57) ABSTRACT

A connection between a source node and a destination node is automatically routed and switched in a WDM photonic network, on receipt of a connection request. A switching and routing mechanism selects a plurality of valid link paths using a path tree, where invalid branches are eliminated based on constraints received in the connection request, and on a link and path cost functions. A regenerator placement tree is used for determining a plurality of viable regenerator paths for each valid link path. On the regenerator placement tree, non-viable branches are eliminated based on constraints received with the request and on regenerator availability at the intermediate nodes along the respective path, and on the specification of these available regenerators. Next, the switching and routing mechanism assigns a set of wavelengths to each viable regenerator path, and estimates the performance of the path using a Q estimator. The regenerator paths are ordered according to their performance and the switching and routing mechanism attempts to setup a paths to serve the request, starting with the best path.

30 Claims, 10 Drawing Sheets

FIGURE 4A
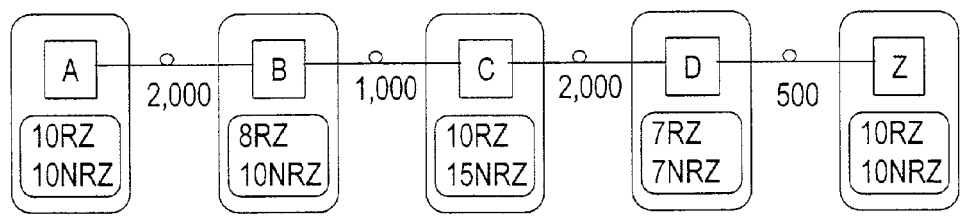
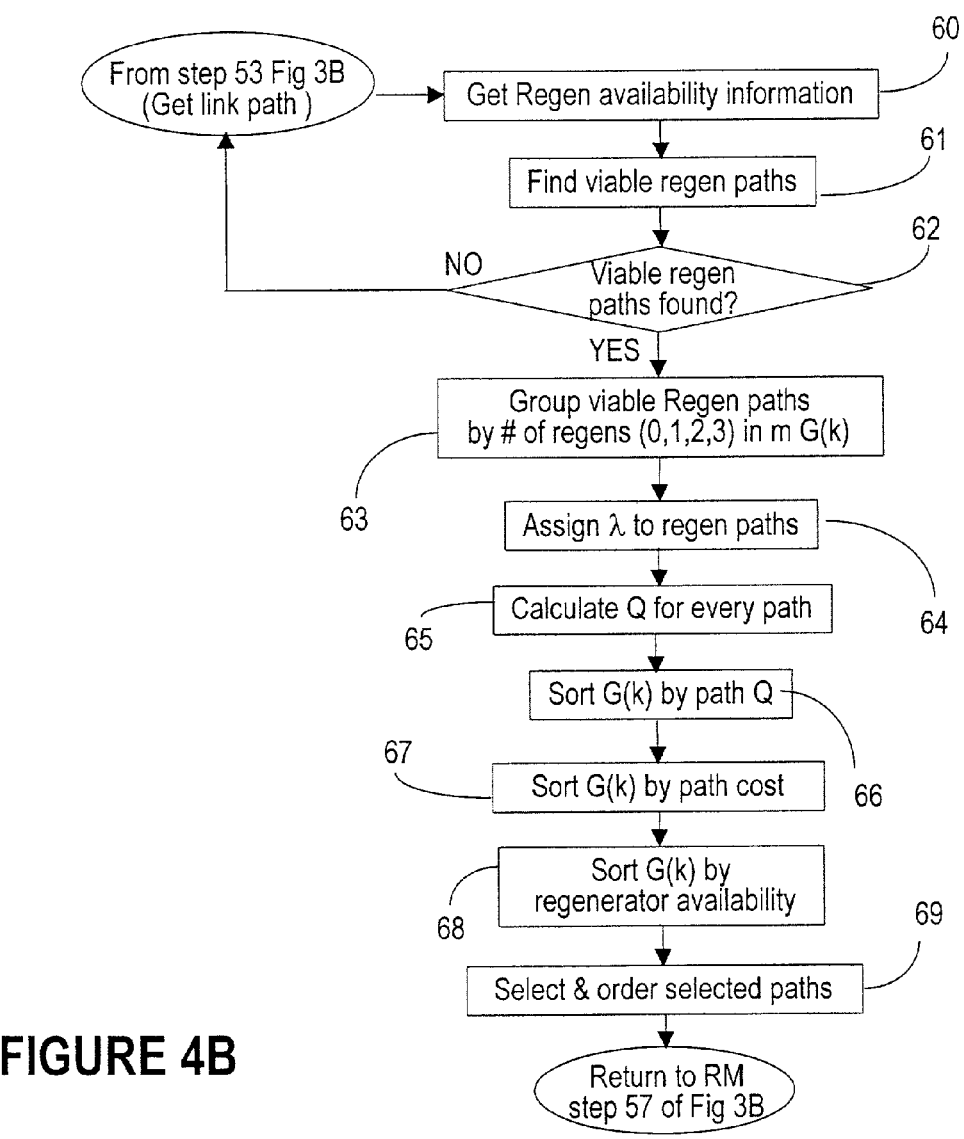
FIGURE 4B

WAVELENGTH ROUTING AND SWITCHING MECHANISM FOR A PHOTONIC TRANSPORT NETWORK

FIELD OF THE INVENTION

The invention is directed to a telecommunication network, and in particular to a wavelength routing and switching mechanism for a photonic network.

BACKGROUND OF THE INVENTION

The most relevant trends in the optical networking area are the increase in the network capacity and the increase in transmission reach. In response to the exponential growth of Internet use throughout the world, carriers are installing DWDM (dense wavelength division multiplexing) networks, and attempting to scale-up the existing networks by addition of equipment to support new services. It is estimated that expansion of long haul optical communication networks will be in the order of 70–150%, fueled by ever-growing data, and lately video, traffic. Currently, this expansion continues mostly based on improvements to the current transport technologies.

Carriers are also installing ultra-long reach networks, where regeneration of the signal is effected at 3,000 km or more. The ultra long reach was enabled, among other factors, by the advances in transmitter and receiver design, evolution of optical amplification, employment of distributed Raman amplification combined with various dispersion compensation techniques, new encoding and modulation techniques, digital wrapper technology, etc.

However, the current D/WDM networks use point-to-point (pt—pt) connectivity, which means that all channels are OEO (optical-to-electrical-to-optical) converted at each node, which results in very complex and expensive node configurations. On the other hand, a service needs to be established between two end nodes so that in the majority of cases, OEO conversion at the intermediate nodes adds unjustifiable costs and complexity to the network.

In addition, a point-to-point connectivity impacts negatively on the service activation time, or "time to bandwidth" (TTB). Currently, the waiting time for a new optical service in pt—pt networks is over 120 days. TTB includes two components, the network engineering time and the service activation time.

Network engineering includes generating a physical link and node design that will deliver on the specified network performance so that the provisioning application can establish optimal network operation. The output of the engineering stage feeds into the order process with detailed equipment lists and specifications along with configurations so that the installers know exactly where everything needs to be placed. A pt-pt architecture requires very complex network engineering and planning, resulting in large system turn-up time (in the order of months), involving extensive simulation, engineering and testing. In addition, the pt-pt network requires duplication of equipment for protection/restoration in case of a fault, and, as indicated above equipment for unnecessary OEO conversion.

There is a need to provide a more efficient use of the equipment in the current D/WDM network.

There is a need to break the wavelength engineering bottleneck currently constraining the engineering-to-provisioning ratio, and for wavelengths to became available as a network resource deployable across the network.

If the equipment required to provision a new service is in place, TTB comprises only the service activation time, which includes, besides the time for back office activity and the time for connecting the equipment, the time needed for activating the service. Adding new services in a pt-pt architecture becomes more complex as the number of channels in the network grows, and therefore costly. Furthermore, as the network evolves from linear or ring configurations to mesh connectivity, automation of services becomes a difficult task.

There is a need to provide a network with the ability to automatically route and switch channels from a source node to a destination node with efficient use of OEO conversion.

SUMMARY OF THE INVENTION

It is an object of this invention to provide a method for automatically routing and switching a connection between any two switching nodes of a photonic network. In order to create this, a novel network architecture is necessary, that simplifies network engineering and planning and allows automation of services. In this new architecture, the wavelengths become provisioned units, and the network provides a new service layer for the wavelength-level services.

Accordingly, the invention provides a method for automatically routing and switching a connection in a WDM network, comprising: receiving a request for connecting a source node and a destination node; engineering a plurality of viable regenerator paths between the source and destination nodes, based on constraints in the request and on current network configuration and loading; and selecting a best path from the plurality of regenerator paths to serve the connection.

According to another aspect of the invention, automatically routing and switching a connection in a WDM network includes: engineering a plurality of viable regenerator paths between a source and a destination node, based on user constraints, current network configuration and on regenerator placement rules; assigning a set of wavelengths to each the viable regenerator path based on wavelength rules and on current network loading; and selecting a best path from the plurality of regenerator paths to serve the connection.

The invention is also directed to a routing manager for a photonic WDM network comprising: a routing module RM for constructing 'n' different valid link paths between a source and a destination nodes; a regenerator placement module RPM for engineering 'm' groups of viable regenerator paths for each the link path, each the each the group having 'k' regenerators; a wavelength assignment module WAM for assigning a set of wavelengths to each the viable regenerator path; and a control unit for receiving a request for establishing a connection between the source node and the destination node and managing operation of the RM, the RPM and the WAM for selecting a best path available for the connection.

According to still another aspect of the invention, a connection is automatically switched and routed over a reconfigurable photonic network by maintaining updated information on status and operation parameters of a bank of wavelength-converter/regenerator devices connected in stand-by at a plurality of switching nodes of the photonic network; investigating availability of the devices to locate a device based on the updated information; and switching the device into a communication path according to a current performance parameter of the communication path.

A method of engineering a plurality of regenerator paths between a source node and a destination node of a photonic switched network is also presented. This is accomplished by constructing a plurality of viable regenerator paths, based on current network topology data, operational parameters of all regenerators available in the WDM network, network loading data and user constraints; and selecting a best path from the plurality of regenerator paths to serve the connection.

Advantageously, the wavelength routing and switching mechanism (WRSM) according to the invention offers flexibility of provisioning in that it allows automatic wavelength route selection and path setup across the network infrastructure. The route selection is based on optical constraints, in that it works with real time photonic path and link budgets. WRSM reacts according to these budgets, balancing the network and utilizing regenerative elements where/when necessary.

A photonic network equipped with the WRSM of the invention allows important cost savings, as a network provider is not required any more to buy extra capacity for future services at the time of network deployment. This is because physical wavelength interfaces are now engineered elements, which do not need to be re-engineered during the provisioning process; the wavelengths can be deployed independent of their provisioning information. The network can be scaled-up only when needed, and the actual provisioning of the wavelength interface can be performed remotely, without human intervention at the physical interface by a simple dial.

BRIEF DESCRIPTION OF THE DRAWINGS

The foregoing and other objects, features and advantages of the invention will be apparent from the following more particular description of the preferred embodiments, as illustrated in the appended drawings, where:

FIG. 3A shows an example of a path search tree, and FIG. 3B is a flow chart illustrating the operation of the routing module;

FIGS. 4A and 4B show the operation of the regenerator placement module, where FIG. 4A shows an example of regenerator availability, and FIG. 4B is a flow chart illustrating the operation of the regenerator placement module;

FIG. 8A illustrates the flow chart of the operation in the wavelength assignment module; FIGS. 8B and 8B show wavelength segmentation.

DESCRIPTION OF THE PREFERRED EMBODIMENTS

Figure 1:
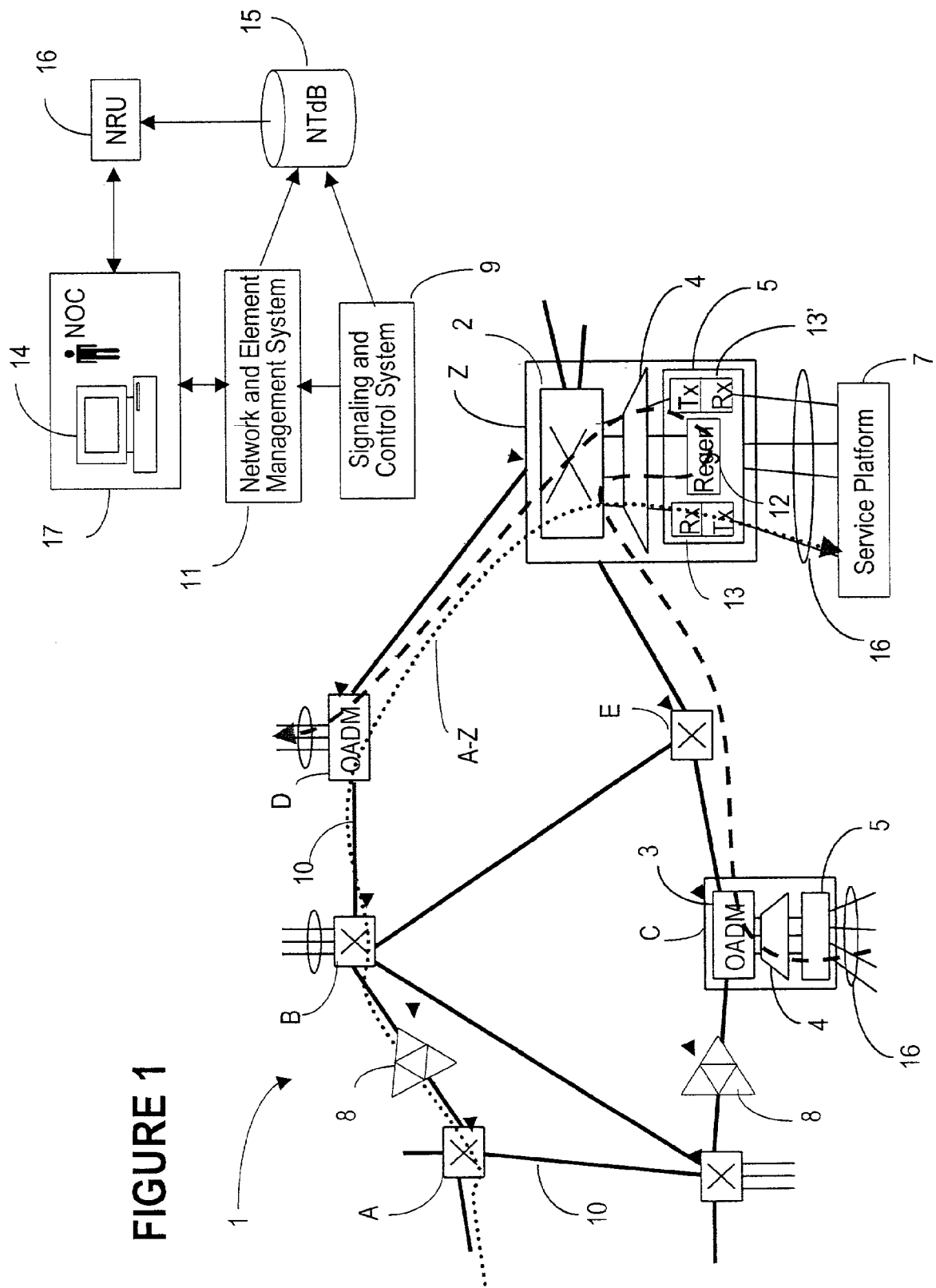
FIG. 1 shows the general architecture for a photonic network to which the present invention is applicable.

FIG. 1 shows an example of a photonic network 1, to which the present invention applies. The DWDM layer of network 1 is mesh-connected with flexibility points instead of traditional pt-pt nodes.

Such a network is illustrated in FIG. 1. The architecture and operation of this network is described in co-pending applications "Architecture for a photonic transport network" (Roorda et al), SN not yet available, docket #1001, filed on . . . , which is incorporated herein by reference.

To summarize, network 1 comprises bidirectional fiber links 10 connecting a plurality of nodes, which are nodes A, B, C, D, E, F, Z in the example of FIG. 1. The nodes could be switching nodes A, B, E, F, Z, OADM (optical add/drop multiplexing) nodes C, D, and bidirectional optical amplifiers 8 which condition the optical signals. Local traffic 16 originating and terminating on a service platform 7 (e.g. a router, an ATM switch, an EXC, etc.) accesses the network 1 at a switching node or an OADM node (also called flexibility sites).

The optical network 1 may be partitioned into the following building blocks, which function together or, in some applications, independently:

a) Electro-optics 5, provided for example at a switching node and an OADM node. The electro-optics system 5 performs on/off ramp of client signals onto/from the optical network and interfaces into the access multiplexing and switching systems of the network. System 5 may include for each express fiber a pool of transponders (TR), and a pool of wavelength converters/regenerators (regens). Transponders 13, 13' are interfaces between the network and the service platform 7. Regenerators 12 provide OEO-based wavelength conversion and/or regeneration in the network core. Also, the transmitters for both the transponders and regenerators are tunable, allowing for flexibility in selecting an A–Z path and the wavelength for that path.

b) Wavelength switches 2 are provided at switching nodes, and optical add/drop multiplexers 3 are provided at OADM nodes. Switches 2 and optical add/drop multiplexers 3 provide optical passthru, (bypassing OEO conversions), and optical add/drop of the local traffic from/to the electro-optics 5.

c) Access multiplexing/demultiplexing and switching subsystem 4 is provided at switching nodes, and at some OADM nodes, such as node C. The access subsystem routes the add and drop channels between the electro-optics subsystem 5 and the respective switch 2 or OADM 3. It distributes individual wavelengths from the line system to the transponders/regenerators, and aggregates individual wavelengths from the transponders/ regenerators onto the line system.

d) Optical line subsystem post/pre amplification and line amplifier subsystem 8 is provided on the links between the nodes. It comprises post, pre and line amplifiers and the associated dispersion and power management equipment necessary for ultra-long haul propagation along the line.

Network 1 is scalable; if new fibers are added between the flexibility sites, the respective optical amplifiers and the associated dispersion and power management equipment can be readily connected at an OA site by adding a respective amplifier shelf, etc. As well, nodes may be scaled-up by adding modules to the respective switch, OADM, access system as/when needed.

A signaling and control system SCS 9 is provided between all nodes and the optical line subsystem. SCS 9 allows topology discovery and fault monitoring, and photonic layer network management. As new resources are added to the network, system 9 updates the network topology database 12 with the new resources, their location and connectivity, operating parameters, etc. It is to be noted that while the database 12 is shown as a unique block, instances of this database are available at each node. Based on this topology information, a network and element management system 11 monitors and controls operation of the network nodes and their connectivity, and provides node and network inventory data and various metrics. This information is stored for both current and future use in a network topology database NTD 15. It is to be noted that this database is not necessarily provided on a unique hardware support as shown, and it can be distributed between the nodes.

The network is also provided with a system for monitoring network resources utilization (NRU) shown generically at 16. System 16 uses the resource data from the network topology database 15 and monitors the utilization of these resource using pre-set thresholds. Whenever a threshold is violated, an alarm is provided on terminal 14 at a network operations center NOC 17, so that the network resources can be re-deployed for optimal utilization, if possible. If after the optimization attempt, some resources are still under-provisioned, the operator may place a purchase order in advance from the time when the respective resources are indeed needed.

FIG. 1 also shows two connections A–Z and C–D. The A–Z connection originates at switching node A, passes through switching nodes B and D in optical format, and is dropped at node Z to service platform 7. Connection C–D originates at flexibility site C, passes through node E in optical format, is OEO converted at node Z for wavelength conversion/regeneration and is dropped at node D. As shown for connection C–D, network 1 has the ability to determine if a channel needs regeneration, looks for a regenerator 12 available at one (in this example) or more flexibility sites on the route of that channel, and allocates the regenerator to the respective path to process the signal accordingly.

Figure 2:
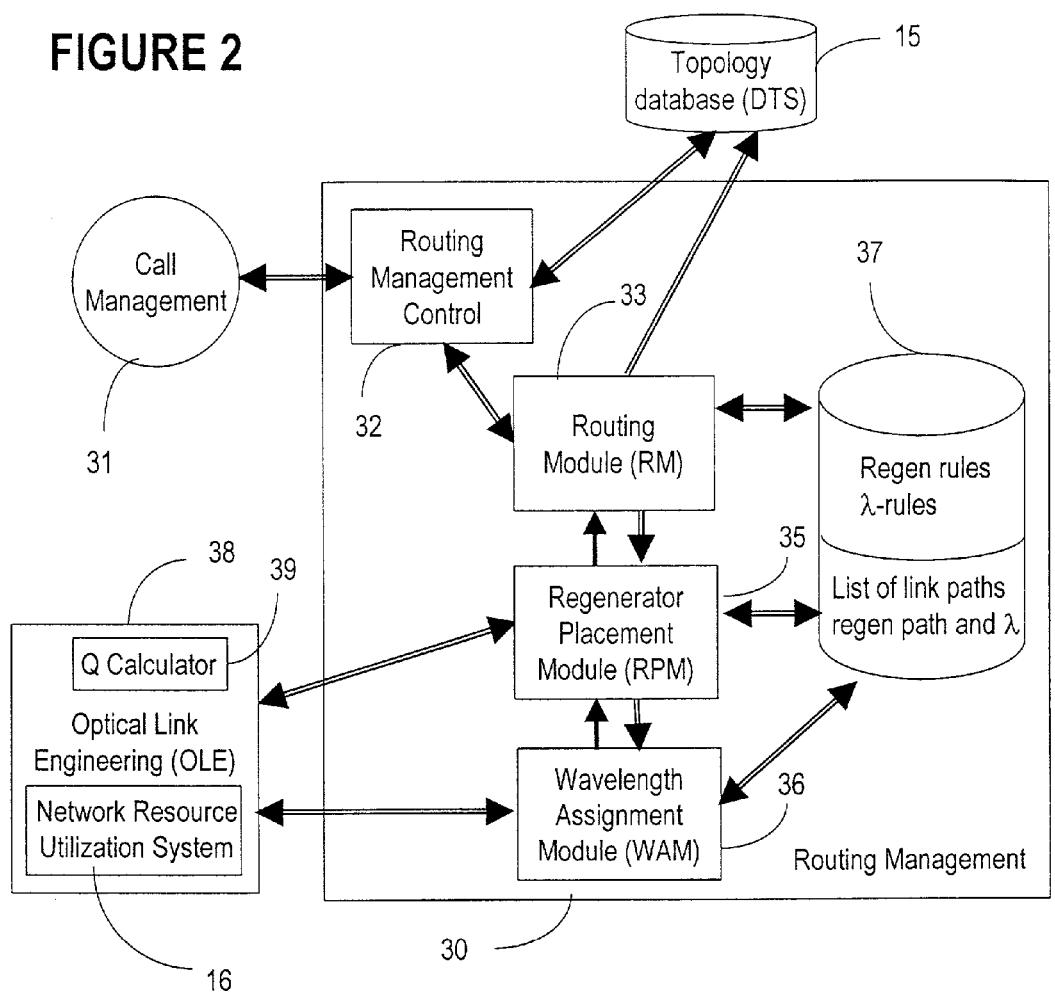
FIG. 2 shows the main modules involved in the routing and switching services within the network of FIG. 1, and their interaction.

FIG. 2 illustrates a logical overview of the modules of the network and element management system 11, which are involved in wavelength routing and switching. This figure also shows the interaction between the modules.

The term "A–Z path" refers to a connection between a source node, generically referred to as node A, and a destination node, generically referred as node Z.

A call management block 31 provides a routing management platform 30 with a connection request. The request can also be referred to as a "dial", "redial" or "call", and refer in this context to a request for a new connection between source node A and sink node, Z. A request defines certain conditions, and generally has some constraints, set according to the class of services applicable to the respective user.

Routing management platform 30 comprises a routing module RM 33, a regenerator placement module RPM 35 and a wavelength assignment module WAM 36. A routing management controller 32 receives the call from block 31, operates modules RM 33, RPM 35 and WAM 36 to generate a list of possible best paths. The regenerator placement module 35 orders the path according to their chances of success and maintains this list until a path is successfully setup. It presents the paths from the list, one by one, to the call management 31, which in turn attempts to set-up a path. If the first path on the list fails, the call management 31 requests the next path from the RMC 32 the next path, and so on, until a path is successful.

A Q calculator 39 is available for use by the modules of the routing management 30, as it will be seen as the description proceeds. The Q calculator is a module provided by an optical engineering platform 38, for estimating a Q quality factor based upon knowledge of the topology and characteristics of the network. It encapsulates the physics of the propagation of signals through equipment and tries to estimate the amount of distortion to a signal due to physical effects, such as cross-talk between wavelengths, to produce an estimate of the quality of the signal referred to as the Q factor.

Routing module 33 is responsible for finding 'n' number of paths, also called link paths, between source node A, and destination node Z. The term 'link path' is intended to indicate that each such A–Z connection is comprised of a different succession of links between end node A and Z. While 'N' link paths may be available for an A–Z connection, only 'n' link paths are selected in the first instance by the routing module 33. The number 'n' can be selected by the user, based for example on the overall system cost versus the setup time. The examples shown assumes that n=4. RM 33 operates according to a set of constraints, which are received with a service request from a call management block 31, as it will be seen later under the title"Routing Module".

Regenerator placement module 35 is responsible for determining 'm' sets of regenerator paths for each link path. A set comprises all regenerator paths with the same number 'k' of regenerators, each having the respective 'k' regenerators placed at a different combination of 'k' nodes. For example, a $1^{st}$ set may have no regenerators, a $2^{nd}$ set may have one regenerator, etc. The maximum number of regenerators in a set is given by the number of intermediate nodes. While 'M' sets may be available for a link path, RPM 35 only selects 'm' sets in the first instance. The number 'm' is again chosen by the user, based upon the loss calculated along the path, or using a more sophisticated Q estimation, based upon the required setup time. The examples shown below assumes m=4. This module operates based on regenerator placement constraints or rules 37 to select the best regenerator path for the respective service request, as it will be seen later under the title "Regenerator Placement Module".

The wavelength assignment module 36 is responsible with finding a single end-to-end wavelength, or a set of wavelengths for each selected regenerator path based again on wavelength constraints or rules 37. This module also provides a wavelength upgrade path for the 0-regenerator and 1-regenerator paths, and upgrades the weakest link (flexibility point-to- flexibility point) for the regenerator paths with k>2, as it will be seen later under the title "Wavelength Assignment Module".

Routing Module 33

Figure 3A:
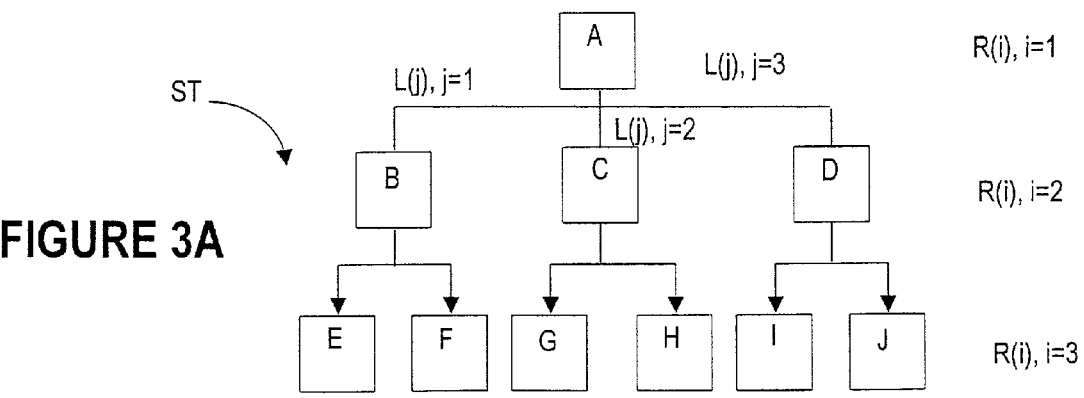
FIGS. 3A and 3B show the operation of the routing module, where

The routing module 33 of FIG. 2 operates as described next in connection with FIGS. 2, 3A and 3B. FIG. 3A shows an example of a path search tree, and FIG. 3B is a flow chart illustrating the operation of the routing module.

Figure 3B:
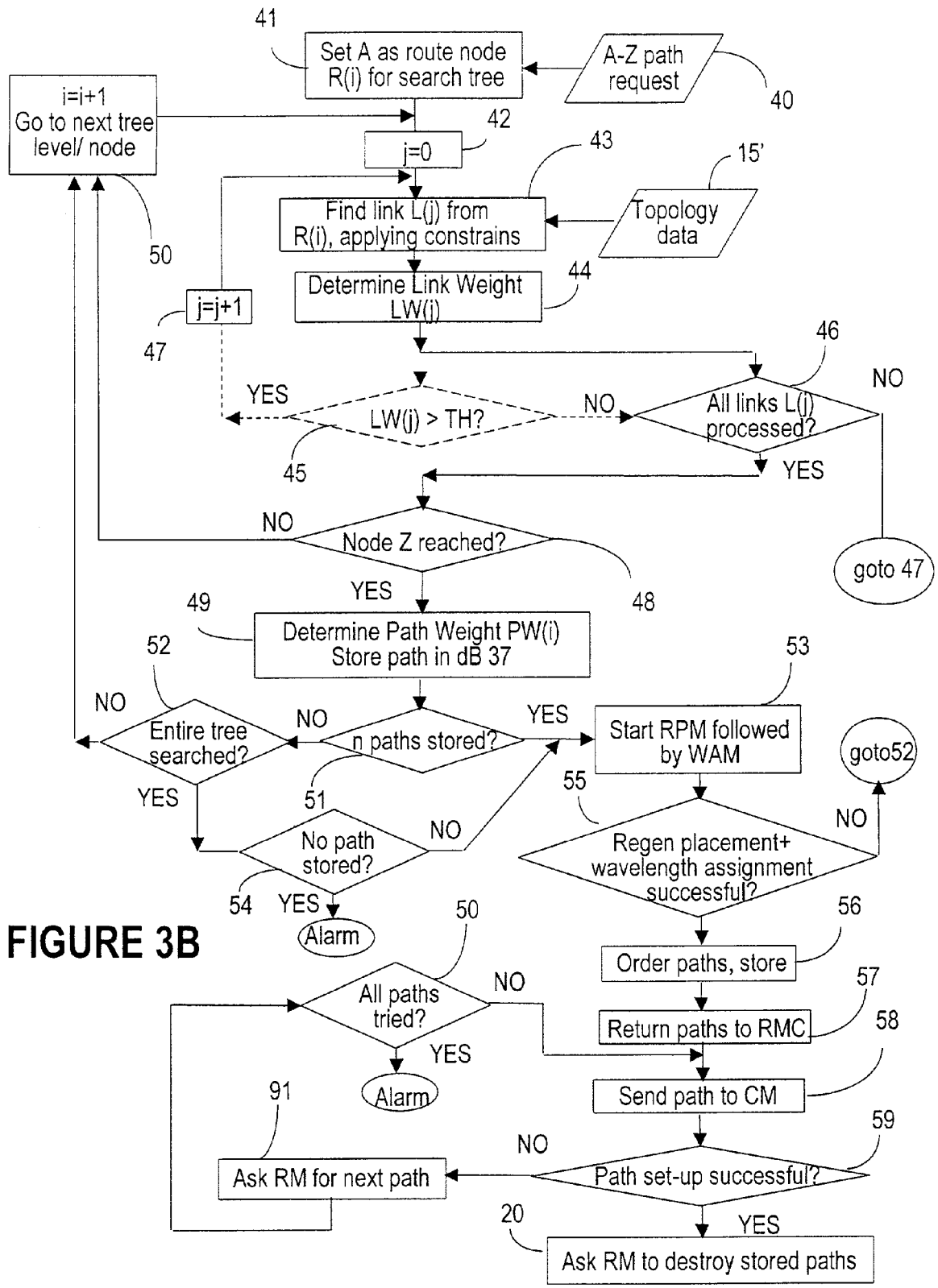

As shown in FIG. 3B, a request is received from the call management 31 for an A–Z path, step 40. Routing module 33 declares node A as the root node, step 41. For the general case, we denote the root node with R(i) and the links originating in a node are denoted with L(j). It is to be noted that call management 31 works always with the routing module 33 of the root node R(i).

Next, RM 33 builds a search tree ST as in the example of FIG. 3A, using topology data imported from the database 15, as shown at 15', and applying any constraints that were specified with the path request, steps 42, 43. Module 33 also associates a link weighting function to each link L(j), as shown in step 44. The weights are denoted with LW(j), and may be defined as shown in EQ1 by way of example.

$$LW(j) = (\text{link length} * \text{link cost}) + (\text{estimated link equipment cost}) + (\alpha * \text{link loading cost}) + (\text{cost for type of fiber}) \quad (EQ1)$$

where:

α is a binary threshold based on the load of the link. α is set to '0' or '1' and the correct setting at which α becomes '1' is to be determined by simulating various network topologies with various loading thresholds. For example, if the link-loading threshold has been set to 80%, then whilst the link is less than 80% loaded this parameter is 0. Once the link load increases above 80%, α becomes 1. 'Link weighting cost' is defined as the total cost of using the link. Link cost is the amortized cost given per unit of link length (e.g. km).

'Link length' is the physical length of the link. The purpose of this parameter is to bias paths towards shorter routes.

'Estimated equipment cost of link' takes into account only equipment along the link, i.e. the line subsystem (optical amplifiers, DCMs, etc.).

'Link loading cost' is defined as the average percentage load on a link. For example, if there are 5 fibers between two flexibility points, the average loading cost is the average cost across these 5 fibers. The purpose of this parameter is to move traffic away from the most heavily used routes as the network fills up. Other criteria may be envisaged to estimate link loading cost.

'Amortized cost for type of fiber' is associated with the type of fiber along the link e.g. LEAF™, True-Wave™ classic, etc.

Shown in dotted lines on FIG. 3B is a variant of path processing, whereby if the LW(j) is higher than a threshold, step 45, the respective link is abandoned, step 47. In this variant, the weighting factor for the next link is calculated, in steps 43, 44, 45, until the weights for all links at the respective tree level and originating from the root R(j) are determined, branch NO of decision block 45 and branch YES of decision block 46. The threshold can be for example a maximum cost for a certain class of service associated with the call (i.e. privileges for the user who placed the request). The threshold can also be a minimum value.

Variants where all links are processes are also possible, in which case block 45 is not necessary.

If all links from a root node were processed, module 33 determines if node Z was reached, step 48, and if not, it moves to the next node at the same level of the tree, or at the next level, step 50. Operations 42–48 are repeated for these levels of the tree ST, and for all nodes at the level.

Once node Z is reached, meaning that an A to Z link path was found, as shown by branch YES of decision block 48, a path weight PW(i) is calculated for the respective link path, and the path is stored, step 49. PW(i) may again be a cost function for the final path, which could be defined for example as:

$$PW(i) = (\text{ingress node cost}) + (\text{egress node cost}) + (\text{estimated regen costs for path}) + \Sigma(\text{link weight costs}), \quad (EQ2)$$

where,

'Ingress Node Cost' is the amortized cost associated with node A, i.e. the cost of the transponder.

'Egress Node Cost' is the amortized cost associated with node Z, i.e. the cost of the transponder.

'Estimated regen costs for the path' is estimated for example by considering that a regenerator must be inserted in the path every 3000 km. This cost is also amortized. It is to be understood that this distance is given here as a practical example for explaining the operation of the RM 33; the reach of a regenerator depends on the particular regenerator used. Furthermore, it is possible to extend the estimated regenerator cost to other regenerator types; for example, a hybrid RZ/NRZ type may be used. Nonetheless, the type and reach of the regenerators are irrelevant to the invention, it is important to correctly estimate the cost taking into account the available devices. It is also possible to use a Q estimation for the path in order to determine the number of regenerators needed and their cost.

'Link weight costs' are the weights LW(j) assigned to each link along the path. These are summed and added to the path cost.

The next path is determined in same way, until 'n' link paths are constructed and stored, as shown by branch NO of decision blocks 51, 52.

In the event that 'n' link paths cannot be found due to physical constraints or because the weight function for a particular request is exceeded on all remaining branches of the search tree, branch NO of decision blocks 51, and branch YES of decision block 52, the less than 'n' link paths that have been found are given to the regenerator placement module 36. This is shown by branch NO of decision block 54. In the case that no path at all could be found after the entire search tree has been examined, the network and element manager 11 provides the operator at NOC 17 with appropriate alarms, branch YES of decision block 54.

Once all 'n' (or less) link paths are built, and the associated path weights PW are calculated, the link paths are passed to the regenerator placement module 35 and wavelength assignment module 36, step 53.

It is possible to apply another mechanism to obtain one path only. For example, a shortest path first algorithm may be used, in which case the path weight may be calculated using EQ3:

$$FW(i) = (\text{ingress node cost}) + (\text{egress node cost}) + (\text{estimated regen costs for path}) + \Sigma[(\text{link length} * \text{link cost}) + (\text{estimated link equipment cost}) + (\alpha * \text{link loading cost}) + (\text{cost for type of fiber})] \quad EQ3$$

Again, it is to be noted that the above equations are provided by way of example, any other ways of determining an estimated cost for the path(s) may be equally employed.

If RPM 35 and the WAM 36 cannot find a feasible route, branch NO of decision block 55, module 33 continues to build the search tree, by returning to step 52, to find another link path. If the regenerator placement and wavelength assignment have been successful, the paths found after step 55 are ordered in step 56, as it will be seen in connection with FIG. 7. The ordered paths are returned to routing management control 32, step 57, which presents them in sequential order to the call management 31, step 58. Now, the network and element management system 11 can initiate physical implementation (lighting the A–Z path). System 11 tries to set-up the paths starting with the best path on the list, and if path set-up is successful, branch YES of decision block 59, RM 33 destroys the stored paths, step 20. On the other hand, if the path cannot be set-up, the next best path is tried, steps 91 and 50. If no path from the best paths list can be set-up, branch YES of decision block 50, the operator at NOC 17 or the setup software in the case of a UNI request is informed of this failure.

The routing management platform 30 also takes into consideration the type of protection associated with an A–Z request. A 0:2 path request is handled as two 0:1 requests. This means that for a 0:2 path request, the routing management platform will first find a principal A–Z path, and then provide this principal path back to the routing module 33 as a constraint, so that the module finds a secondary path. Persons skilled in the art will be aware of other approaches to find 0:2 path directly instead of using two 0:1 path requests with constraints. One approach is to find a cycle within the topology graph which includes the source and destination nodes. By splitting the cycle into two paths starting at the source node and ending at the destination node the 0:2 path can be obtained. Another approach would be to use a Ford-Fulkerson augmented path algorithm to find a 2 unit flow from source node to destination node and then use a tree search technique to find two paths between the source node and the destination node. This approach has the advantage that it can be extended to find 0:k paths where the Ford-Fulkerson augmented path algorithm is used to find a k unit flow from source node to destination node followed by a tree search technique to find k paths.

The routing module 33 supports two different scenarios with respect to selection of the end transponders, depending if the transponders are pre-provisioned or not.

In the case where the transponders are pre-provisioned, the route selection is constrained at the source node A and sink node Z. That is, the first link between node A and the first intermediate node along the path is fixed; flexibility of routing comes only after the first intermediate node. Also, since the end transponder at node Z is pre-provisioned, routing must ensure that the path enters site Z on the side where the sink transponder is connected.

In the case where the transponders are post-provisioned (floating case) routing is not constrained at either the beginning or end of the path, and the module makes the decision as to which transponder to use.

Regenerator Placement Module

FIGS. 4A and 4B show the operation of the regenerator placement module 35. FIG. 4A gives an example of the type and number of regenerators available at flexibility sites A, B, C, D, and Z along a link-path A–Z, and FIG. 4B illustrates the flow chart with the operation of the regenerator placement module 35 for the example of FIG. 4A.

In this example, there are two types of regenerators available, a RZ-type (return-to-zero encoding of data) regenerator and a NRZ-type (non-return-to-zero) regenerator. Each type has a different reach, and for the purpose of illustration, let's consider that the reach of the NRZ regenerators is approximately 1500 km and the reach of RZ regenerators is approximately 3000 km. Also, let's assume that a NRZ regenerator costs half of the price of a RZ regenerator; both regenerator reach and cost are taken into consideration by module 35.

As seen in FIG. 4B, a link path selected by routing module 33 is input first to module 35, as seen in steps 53 on FIG. 3B. The regenerator availability data is provided by DTS 15, step 60, and module 35 attempts to find viable regenerator paths, steps 61, 62.

Figure 5A:
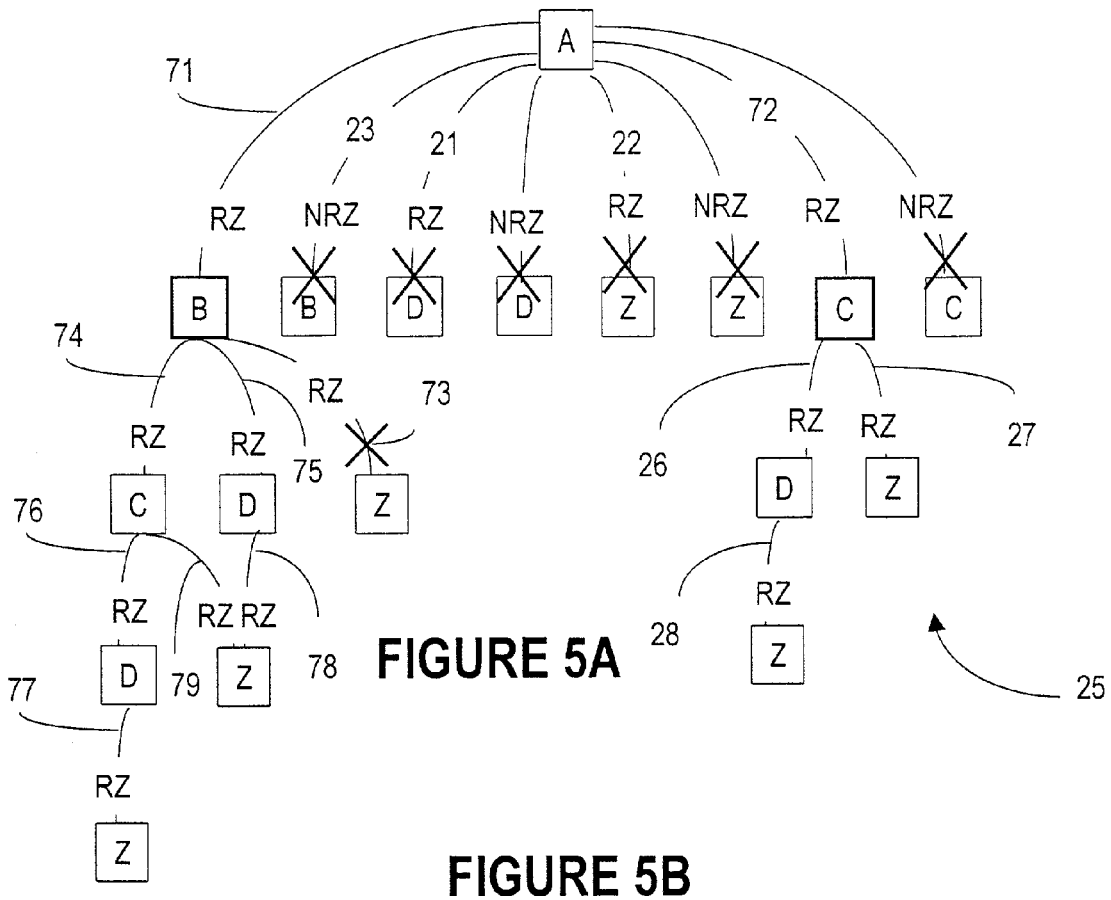
FIG. 5A shows a regenerator placement search tree.

The regenerator placement module 35 attempts to place the regenerators in the most optimal position along the link path by building a 'regenerator availability tree' or 'regenerator tree' 25 as shown in FIG. 5A. As the name suggests, the tree provides a list of valid regenerator vs. reach combinations. The regenerator tree has 'branches' for all possible combinations of number (k) and position of regenerators for the respective link path. In other words, the module analyzes all variants with a regenerator at the first level of the tree, in this example node B (branch 71), node C (branch 72), node D (branch 21), or no regenerators at all (branch 22). Next, module 35 tries all variants with a regenerator at the second level of the tree, which are: from node B, a regenerator at node C (branch 74), or at node D (branch 75), or a branch going directly to end node Z (branch 73). Similarly, regenerator paths are formed with a first regenerator at node C, and the second level providing for a regenerator at node D (branch 26) or going directly to node Z (branch 27). The third level is constructed in the same manner, and it includes branches 76, 79, 78, and 28, while level four includes only branch 77.

At the same time, the module abandons the branches that are not viable, based on the regenerator presence, type and reach of the end transponders and regenerators at the intermediate nodes. A variant is 'viable' and declared a 'regenerator path' for a given link path, if the optical signal originating at node A can reach node Z with or without regenerators switched in the link path.

In the example of FIG. 5A, valid variants for the first level are the regenerator paths including branch 71 to node B and branch 72 to node C, which nodes are at a 2000 km and respectively 3000 km distance from node A. The signal from node A cannot reach node D or Z without regeneration, since distances A–D and A–Z are greater than the reach of an RZ transponder. Therefore branches such as 21 are invalid, and they are not pursued further.

In addition, as the distance A–B is 2000 km, the transponder at node A needs to be of RZ type, which has a reach of 3000 km, rather than of NRZ type, which cannot reach node B. Therefore branches like 23 are also abandoned. The abandoned branches are crossed with an X in FIG. 5A. It is noted that the type and reach data specified above are by way of example to show how the viable regenerator paths are selected.

As discussed above, the type of transmitter at the beginning of the path determines the type of regenerator(s) that can be used along the entire path. For example, since the transponder at A needs to be of type RZ to reach node B, any regenerators used along this regenerator path must be of the RZ type. Nonetheless, module 35 is free to choose the equipment type after the tree was built if both a NRZ and RZ regenerator paths were found (not in the example of FIG. 4A).

Figure 5B:
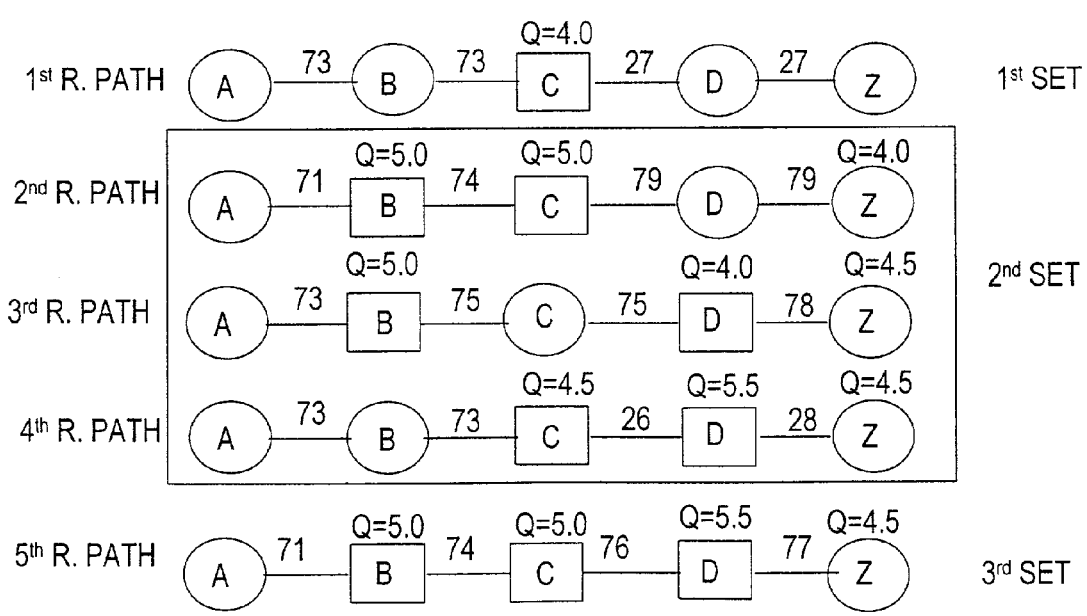
FIG. 5B shows an example of how the regenerator paths are sorted.

By applying reach and type constraints to the example of FIG. 4A and abandoning the paths that are not viable, (marked by 'X's' on FIG. 5A), five viable regenerator paths may be constructed for the example of FIG. 4A, and they are shown in FIG. 5B. Of course, the viable regenerator paths may be determined using a variety of alternative techniques, including a wave propagation simulation, or a Q estimation; the intent is to determine if 'branches' can transport the signal from the source to destination.

Returning to FIG. 4B, module 35 groups the regenerator paths into 'm' sets, where preferably m=4, step 63. However, in the example analyzed here, there are only three sets available (m=3), shown in FIG. 5B, namely a $1^{st}$ set with the $1^{st}$ path having one regenerator (k=1), a $2^{nd}$ set with the $2^{nd}$, $3^{rd}$ and $4^{th}$ paths having each two regenerators (k=2), and a $3^{rd}$ set with the $5^{th}$ path having three regenerators (k=3). In this case, as in other circumstances where the module cannot return the 'm' sets, the module processes further as many regenerator paths as it can build. Reasons for not finding 'm' regenerator paths could be for example too few intermediate nodes on the respective link path (e.g. k is maximum 3 in the example of FIG. 3A), a path for k=0 is not viable (i.e. the length of the, path is greater than the reach of the transponder at node A), etc.

There could also be cases where no sets with k=0 or 1 are possible. In such cases, module 35 starts building a first set with 2 regenerators, a second set with 3 regenerators, a third set with 4 regenerators and a fourth set with 5 regenerators. Alternatively, the cases for k=0, 1 may not be considered altogether, to reduce the time for path selection.

Returning now to FIG. 5B, module 35 operates on three sets, as four sets are not available in this example. Since the $2^{nd}$ set comprises three regenerator paths, a determination of the best regenerator path needs to be made based on the path performance. However, path performance cannot be estimated until after the wavelength assignment module assigns wavelength for all paths, as shown in step 64, FIG. 4B. It is to be noted that step 64 is further detailed in FIG. 6B.

In a 0-regenerator case (not shown in FIG. 5B as it is not applicable to the above example) a continuous wavelength must be assigned to the entire regenerator path, since there is no opportunity for wavelength conversion between nodes A and Z. The term 'continuous wavelength' is used for a segment of a path, which uses the same carrier wavelength along one or more links; the wavelength changes at a regenerator site provided with a wavelength converter.

On the other hand, for the regenerator paths of the $1^{st}$, $2^{nd}$ and $3^{rd}$ sets, it is less desirable to use a continuous wavelength from A–Z, in order to reduce wavelength fragmentation; the continuous wavelength paths are required primarily for 0-regenerator cases. Therefore, module 36 assigns to regenerator paths wavelengths that are already fragmented, since the opportunity to change the wavelengths along such a path is always available at the regenerator sites.

Let's assume that module 36 located a plurality of fragmented wavelengths for each regenerator path; the reference numerals above the connections between the nodes of FIG. 5B, which identify the tree branches in FIG. 5A, correspond to a certain distinct wavelength.

The prioritization may be performed based on the minimum Q value of the path, steps 65, 66. In this case, Q value is first estimated at each regenerator site and at the end transponder, using Q calculator 39 provided by the optical link engineering module (OLE) 38 (see FIG. 2). An example of Q values is shown on FIG. 5B for all regenerator nodes and the end node Z.

The $Q_{est\_min}$ of the respective paths is determined as being the lowest Q value calculated along the path, since a path is only as strong as it's weakest link. The $Q_{est\_min}$ value for the paths in the example of FIG. 5B are 4.0 for the $2^{nd}$ path, 4.0 for the $3^{rd}$ path and 4.5 for the $4^{th}$ path. The path with the highest $Q_{est\_min}$ value in the $2^{nd}$ set is the $4^{th}$ path (Q=4.5) in this case.

The paths in each set (here in the $2^{nd}$ set) are next ordered by the path cost, step 67. As indicated above, the price of an RZ regenerator is assumed to be considerably greater than the price of an NRZ regenerator. However, all paths in the above example use RZ regenerators, so that the paths in the $2^{nd}$ set have the same cost, let's say $200,000.

Alternatively, the paths may be ordered first by the cost and then by $Q_{est\_min}$.

The number of regenerators available at each site is next considered, step 68; these numbers are shown in FIG. 4A. Again, since only RZ regenerators are being considered in this example, the number of NRZ regens available has no bearing. To reiterate, the $2^{nd}$ path requires an RZ regenerator at node B and one at node C, the $3^{rd}$ path requires an RZ regenerator at node B and one at node D, and the $4^{th}$ path requires an RZ regenerator at node C and one at node D. Since there are fewer RZ regenerators available at node D (7) than at node B (8) in this example, the $2^{nd}$ path is better than the $4^{th}$ path. Since there are fewer regenerators available at site D than at site C, the $2^{nd}$ path is better than the $3^{rd}$ path. The $2^{nd}$ path is therefore the best choice for the $2^{nd}$ set, and the $4^{th}$ path is the second choice from regenerator availability point of view.

A weighting function is employed at step 69, which sorts the regenerator paths taking into account the estimated Q values, the path cost, and the regenerator availability. Below is an example of such a cost function:

(Ordered Path Weighting)=($\alpha$*Q balance)+($\beta$*Regen cost)+($\delta$*Regen availability)   (EQ4)

Where:
$\alpha$=Weighted % for Q balance importance in biasing selection
$\beta$=Weighted % for Regen cost importance in biasing selection
$\delta$=Weighted % for Regen availability in biasing selection For example, $\alpha$=50%, $\beta$=50% and $\delta$=0%. Also, the percentage splits for both the Q balance ordering and the regenerator cost ordering could be:

$1^{st}$ place=50% of the weight
$2^{nd}$ place=30% of the weight
$3^{rd}$ place=10% of the weight
$4^{th}$ place=8% of the weight
$5^{th}$ place=2% of the weight
$6^{th}$ place and worse=0% of the weight.

Evaluating the results from the Q balance ordering and the regenerator cost ordering, and putting these results into EQ4, the best regenerator path of the $2^{nd}$ set is the $4^{th}$ path. If a regenerator path in the set has the same path weight as another, then an arbitrary decision is made as too which regenerator path to use for that set.

Namely, a Q balance of 50% total path weight contribution, gives a weight of 25% to $4^{th}$ path (50% of the 50%) since it came $1^{st}$, and gives a weight of 7.5% to $2^{nd}$ and $3^{rd}$ paths.

The weight of the regenerator cost is the same for all paths, namely 8.333% (50% total path weight contribution).

As for this example $\gamma$=0, regenerator availability is not considered, for simplicity. Therefore the total weights are, from EQ4:

$2^{nd}$ path=7.5+8.333=15.833
$3^{rd}$ path=7.5+8.333=15.833
$4^{th}$ path=25+8.333=33.33

EQ4 results in selection of the $4^{th}$ path as the best path in the $2^{nd}$ set.

Ideally, the output of step 69 in the flowchart of FIG. 4B, are 'n' link paths, each with 'm' sets of regenerator paths, which are returned to the route management control 32. If path selection, regenerator placement and wavelength assignment have been successful, the paths must be ordered as shown in step 57 of FIG. 3B.

Figure 6A:
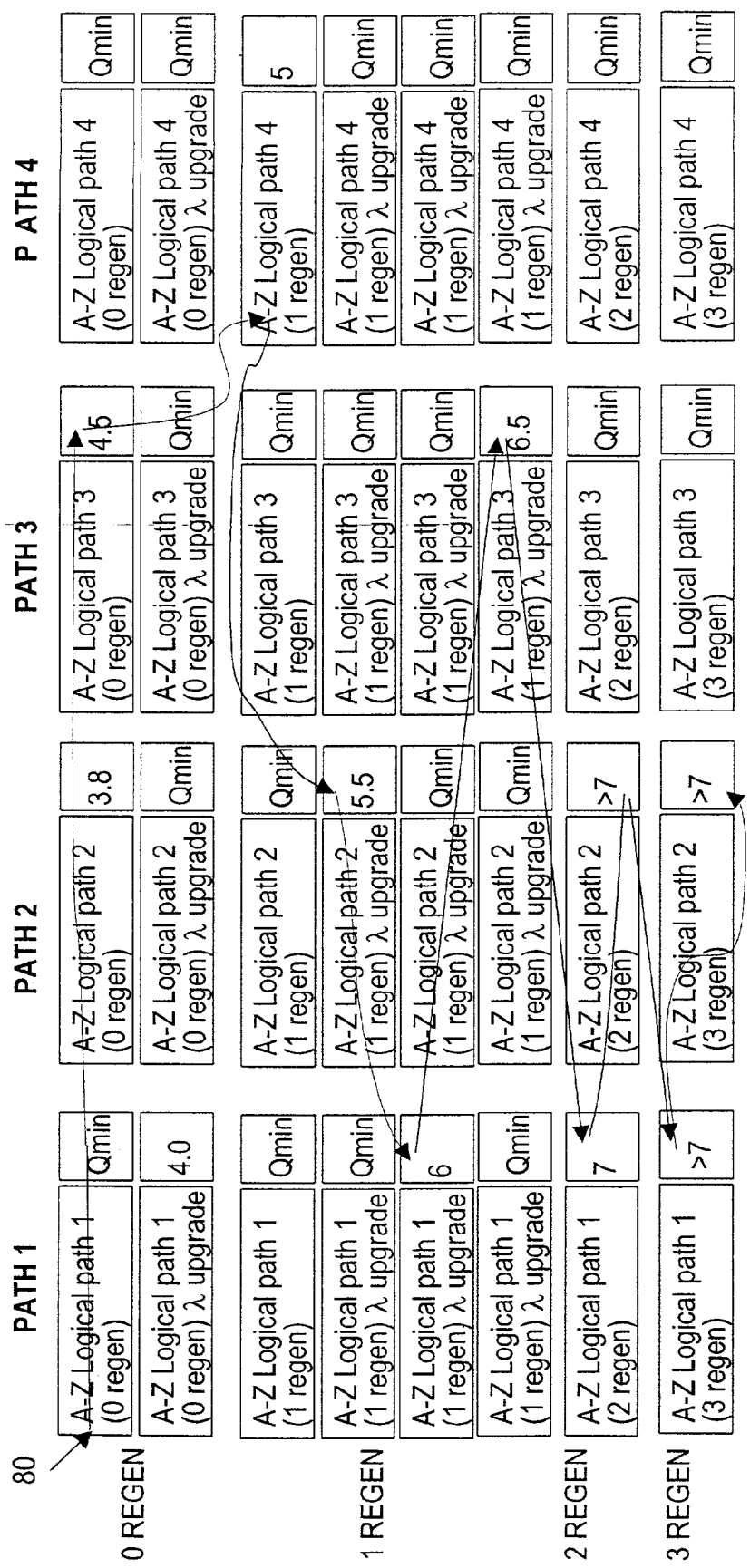
FIG. 6A shows an example of selecting a regenerator path.
Figure 6B:
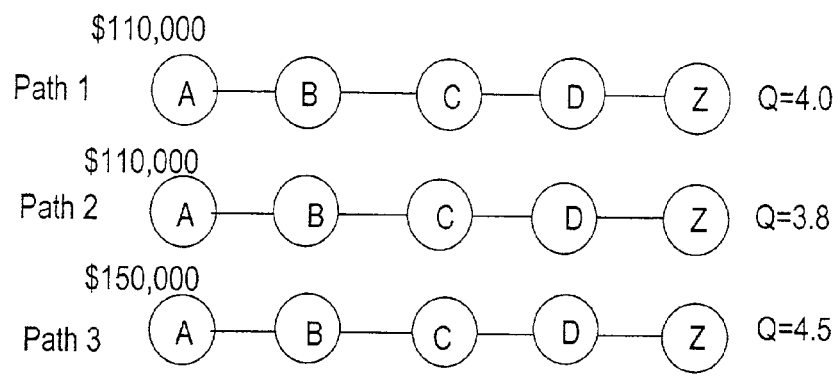
FIG. 6B shows how a regenerator path is selected in the example of FIG. 6A according to cost and Q value.
Figure 6C:
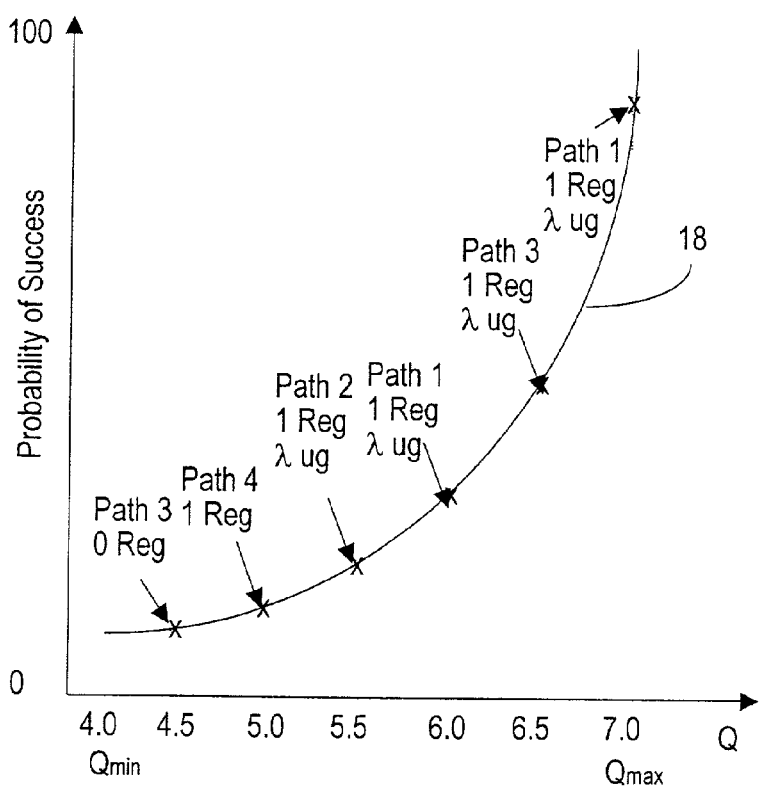
FIG. 6C shows a Q—probability of success graph used for expediting path ordering.

Ordering of the best paths can be for example based on the path cost and Q performance, as shown in FIGS. 6A, 6B, 6C and 7. FIG. 6A shows an example of the final path vs. regenerator matrix, which in this case has 32 cells. FIG. 6B shows how a regenerator path is selected in the example of FIG. 6A according to cost and Q value and FIG. 6C shows a Q—probability of success graph used for expediting path ordering.

The matrix of FIG. 6A is ordered in terms of lowest cost, step 101. The entry point to this matrix is always the lowest cost path (as determined by applying the cost function EQ3), which is placed in the top left hand corner 80 of the matrix. The number of all possible link and regenerator path combinations is n×m, which is 16 for the preferred 'n' and 'm' values (n=m=4). The term 'wavelength upgrade' refers in this specification to re-assigning another wavelength to a regenerator segment, selected to perform better than the current wavelength. Specifically, some wavelengths can reach further than others; the performance of a wavelength also depends on the spacing between the channels on the respective regenerator segment.

In this example 0 and 1 regenerator paths are present; for the 0-regenerator paths there is only one possible upgrade path and for the 1-regenerator path there are three possible upgrade combinations possible. This means that in the 0 and 1 regenerator case there are additional 4 path sets for each of the 4 paths; giving a final matrix of size 32. In the case where the first regenerator path set had 2 or more regenerators, a wavelength upgrade will only be provided for the weakest segment (flexibility point-flexibility point) along the path; hence, in this case the final matrix will have less than 32 cells. It should be noted that in the 2 or more regenerator case all wavelengths along the path could be upgraded and in this case the final matrix would have more than 32 cells.

The ideal method for finding the best available solution for the A–Z path is to attempt to set-up all paths in steps 59 of FIG. 3B, starting with the lowest cost path and working towards the highest cost path which also has a higher Q value and hence a greater chance of success. The duration of these operations impact on the total time for setting-up the new service. If we assume that the path set-up time is 8 seconds and the path tear-down time is 4 seconds (12 seconds for a try), trying all paths could take a waiting time of 32×12−4=380 seconds (6.333 minutes) for the worst case scenario when only the last path was found to work. It is to be noted that 4 seconds are deducted from the waiting time since there is no teardown time for the last path. As mentioned previously in the case where the first regenerator path set is a set with two or more regenerators, there will be less than 32 cells, because all segments along the path will probably not have wavelength upgrades.

In the ideal case where there is time to try every path, path ordering starts by trying the 0 regenerator path shown at the top left hand corner of FIG. 6A, and works through the matrix one row at a time from left to right until a path is successfully setup.

Figure 7:
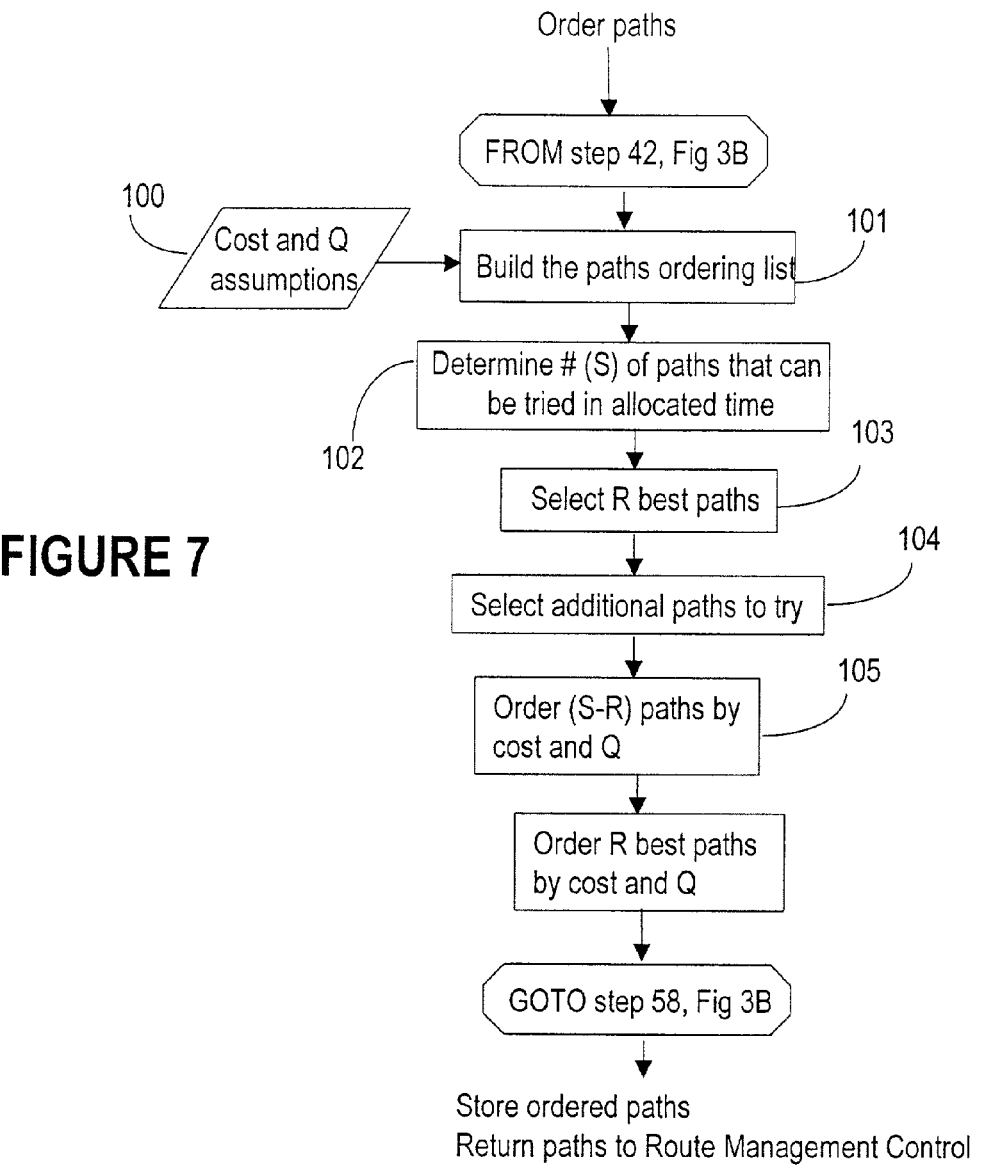
FIG. 7 is a flow chart showing in more detail the step of path ordering of FIG. 3B.

However, in the case that the customer is not willing to wait until all paths are tried, an alternative strategy may be employed, as illustrated in FIG. 6A, by the arrows, FIG. 6B, FIG. 6C and shown by the steps of FIG. 7.

FIG. 6B gives an example of costs and Q values of the 0 regenerator Path 1, Path 2 and Path 3 where $Cost_{P1}=Cost_{P2}$ and $Cost_{P2}<Cost_{P3}$, while $Q_{P2}<Q_{P1}<Q_{P3}$. It is to be noted that the example of FIGS. 6A and 6B use the terms path 1, path 2, path 3 and path 4 for the link-paths; no confusion should be made with the $1^{st}$ to $5^{th}$ paths of FIG. 5B.

Let's assume that path 1 does not work, in that the $Q_{est\_min}$ value is 4.0 and a higher Q is requested. RM 33 checks next path 2. Path 2 has a lower $Q_{est\_min}$ than path 1, hence a lower chance of success. Moving next to path 3, this has a Q value higher of that of path 1 and path 2, hence, path 3 is selected, even though the cost of this path is higher than that of path 2. The logic behind this is that since path 1 failed with a Q of 4.0 the chance of path 2 working is even lower since it has a Q of 3.8 and since the amount of time to find a workable solution is limited the path selections made must be moving towards a higher Q value and hence a greater probability of success. Path 3, 0 regenerators is thus the next path selected from the matrix of final paths.

FIG. 6C extends this concept by introducing Q thresholds, which are defined to guide the selection process and reduce the waiting time necessary to find a workable path. For example, if the threshold is set between 4.0 and 7.0, then only paths with Q values above 4.0 will be tried, and the assumption made is that paths with a Q greater than 7.0 have a 99.99999% probability of success. As before, the $Q_{est\_min}$ value for a path is the lowest Q value calculated along the path.

Making now the assumption that the maximum waiting time for a particular class of service is 104 seconds, for the worst-case scenario where the very last path tried is the one that works, 104 seconds would allow the system to try a total of S=9 paths (12×9−4) out of the 32 possible. This determination is shown in step 102 of FIG. 7. In step 103, 'R' paths with the higher chances of success are selected out of all potential n×m paths (hereinafter called the 'best paths'). In the example of FIG. 6A, 'R' is 4, and the four cells with higher probability of success are highlighted. The probability for success is given for example by:

$$P(\text{success}) = (R \text{ paths with } Q_{est\_min} > Q_{maintenance} + Q_{margin}) \qquad \text{EQ5}$$

$Q_{margin}$ is a pre-determined, hard coded margin for success.

Next, in step 104, the remaining time is calculated, namely the difference between the waiting time and the effective time used by trying the 'R' best paths. In the example, the effective time is t=4×12−4=44 seconds. Subtracting this from the waiting time gives an additional time of (T−t)=104−44=60 s. As testing a path takes 12 s, and there are 60 s left, this means that 5 additional paths (S−R) can be tested in the waiting time.

The selection criteria is taken one step further by attempting to space path selections evenly between the lower and upper Q thresholds and the number of paths which can be tried in the allowed time, as illustrated in FIG. 6C. A probability of success versus Q value graph 18 may be employed to try and select paths on an evenly spaced basis from 4.0 to 7.0. In this example it is assumed that a path with a Q value above 7.0 will always work, and hence the highest probability paths selected are with Q values ≧7.0. Also, for S−R=5, we could try to select paths that have Q values at 0.5 intervals between 4.0 and 7.0. FIG. 6C shows the selection for this example. Let's say that the paths selected are, in the order of cost and Q value: path 3, 0 regenerators; path 4, one regenerator; path 2, one regenerator, wavelength upgrade; path 1, one regenerator, wavelength upgrade; path 3, one regenerator, wavelength upgrade; and path 1, one regenerator, wavelength upgrade. The selection continues, and the next paths to be selected will most probably be the paths highlighted in FIG. 6A.

Routing management 30 maintains the list of paths, as generically illustrated by database 37 on FIG. 2. The final ordered path selections are returned sequentially by routing management control 32 to call management 31 in the determined order in which the path setup should be tried.

Wavelength Assignment Module 36

Figure 8A:
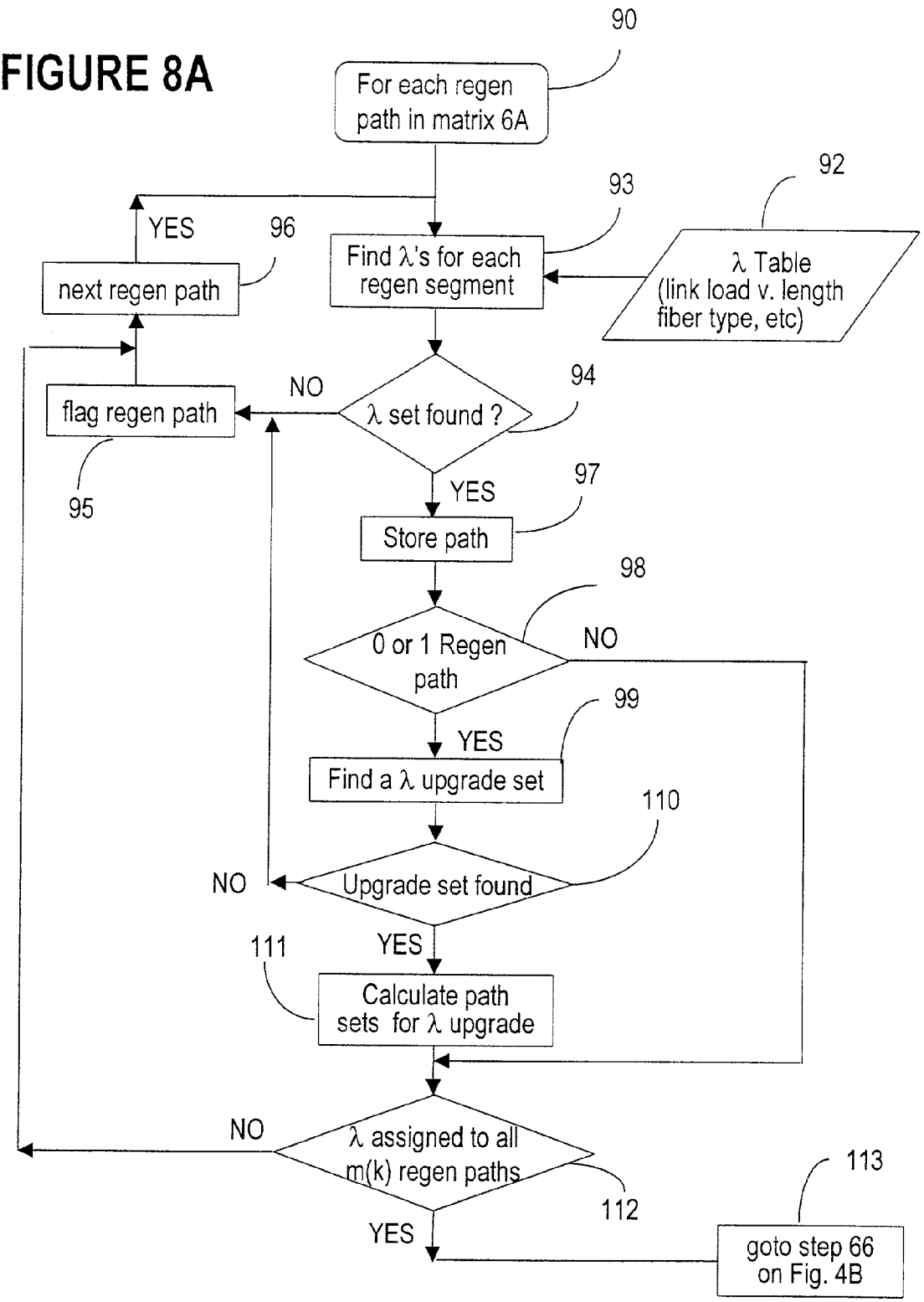
FIGS. 8A, 8B and 8C show the operation of the wavelength assignment module; where
Figure 8B:
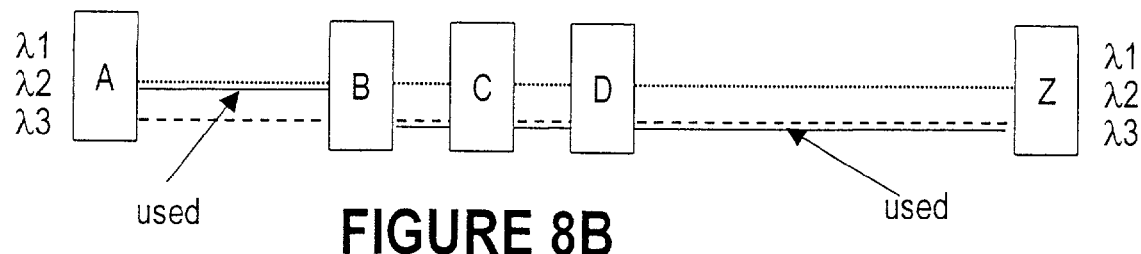
Figure 8C:
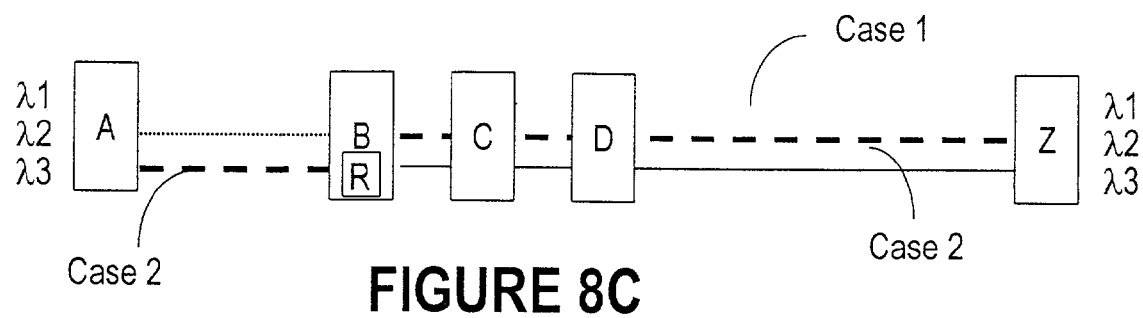

FIGS. 8A, 8B and 8C show the operation of the wavelength assignment module. FIG. 8A illustrates the flow chart with the operation of the wavelength assignment module 36, and FIGS. 8B and 8C show a wavelength segmentation example.

The wavelength assignment module 36 in conjunction with the regenerator placement module 35 are used by the regenerator placement module as shown in FIG. 3B, step 55, and more precisely by the regenerator placement module 35, as shown in step 64, FIG. 4B. The wavelength assignment module attempts to find a single wavelength or a set of wavelengths that would enable a connection along each of the regenerator paths.

Wavelength Assignment module 36 provides the following functionality:

Computes a route for working (and protection if required) traffic using the available resources.

Computes the lowest cost route based on capacity utilization (optimal regenerator placement), OEO utilization, photonic constraints and administrative constraints, such as specific sites where regenerators must/must not be used Considers a Wavelength Fill Sequence.

Resolves wavelength blocking.

Considers fiber types/matching of fiber.

A bandwidth reservation mechanism for both shared and dedicated restoration bandwidth considers predicted photonic performance at the time of restoration, in order to ensure a high probability of connection success during a restoration event.

Module 36 processes all regenerator paths m for each of the n link paths, and attempts to assign wavelengths to the path. In the case of the path sets with 0 regenerators, the selected wavelength must be continuous from A–Z. In a regenerator path with 'k' regenerators, up to k+1 wavelengths may be used. In the first instance of wavelength assignment on paths with 'k' regenerators, where k>0, access to wavelengths that are continuous from A–Z is initially restricted. The reason for this is that when a regenerator exists in the path, better use of network resources may be obtained by using shorter reach wavelengths. Wavelength assignment starts by receiving the regenerator form module 35, step 90.

FIGS. 8B and 8C show an example of wavelength segmentation, for better illustrate how module 36 functions. In the example shown in FIG. 8B, is λ2 already used between nodes A and B and λ3 is used between nodes B and Z (the used wavelengths are shown in dotted lines doubled by a solid line). While using a continuous wavelength λ1 as shown for case 1 on FIG. 8C without wavelength conversion at intermediate sites B, C, D is one solution, this option is initially restricted, as discussed above. Thus, a better solution in the case of a 1-regenerator path, is to place the regenerator at node B, as shown in FIG. 8C, case 2, and to use λ3 on link A–B and λ2 on links B–C, C–D and D–Z, which is available on these links. Case 2 is preferable to case 1.

Preferably, wavelength assignment module 36 is provided with tables, step 92, giving a list with preferred channels versus loading and route lengths. Such tables may be provided for various types of fiber, and stored and loaded at system startup.

Preferred Channels vs. Loading and Regenerator-Regenerator Distance

| Load | Route Length | | |
|---|---|---|---|
| % | <1000 km | 1000–2000 km | >2000 km |
| 25 (200 Ghz) | G1<br>1, 5, 9, 13, 81, 85, 89, 93 | G2<br>17, 21, 25, 29, 65, 69, 73, 77 | G3<br>33, 37, 41, 45, 49, 53, 57, 61 |
| 50 (100 Ghz) | G4<br>1, 5, 9, 13, 81, 85, 89, 93 | G5<br>17, 21, 25, 29, 65, 69, 73, 77 | G6<br>33, 37, 41, 45, 49, 53, 57, 61 |
| >50 (50 GHz) | G7<br>any 1–16 or 81–96 | G8<br>any 17–32, 65–80 | G9<br>Any 33–64 |

In step 93, module 36 finds a λ set for the first regenerator path of the first link path, based on the fiber loading, and using the above table. The most desirable group of wavelengths are always considered first. If no wavelength can be found within this group, a group of wavelengths with greater reach than currently required is tried, but starting at the lower end of the group. If no wavelength group with greater reach exists, then a wavelength group with less reach can be used, but starting at the top end of this group. For example, the assignment can start with G3, if no wavelength can be found within this group, G6 is considered, then G9 and then G2.

Let's consider again the example of FIG. 4A, also assuming a less than 25% loading on the fiber.

The length of the entire path (from node A to node Z) is 5500 km. In the case of a regenerator path with k=0 (no regenerators), the signal has to reach 5500 km. Using the table, the wavelengths with the greatest chance of driving this distance are those of group 3 (G3) which have approximately 200 GHz spacing. If one of these wavelengths is not available continuously for the entire path, then wavelengths from G6 in the 50% loading section are considered (with approximately 100 GHz spacing). If a continuous wavelength still does not exist, any wavelength from G9 in the >50% loading section is considered with approximately 50 GHz spacing). If a continuous wavelength can still not be found, and since a group with a higher reach does not exist, group G2 will be used, staring with the top end of this group, which is wavelength 93. This process continues until a wavelength is found or every wavelength has been considered.

Alternatively, non-table implementations may also be used. It is possible to use Q estimates for a given wavelength for a specific path. A variety of strategies may be devised for wavelength upgrades; the intent is to find a better wavelength than the one currently used. Preferably, such strategy needs to be driven by network cost and path setup time.

RPM 35 builds the $1^{th}$ path (see FIG. 5B) as a one-regenerator path, with the regenerator placed at flexibility point C. Again, the >2000 km wavelengths of G3 with a less than 25% loading are considered and if a wavelength can not be found, G2 will be used, staring with the top end of this group. If no wavelength can be found on the segment from node A to node C, the $1^{st}$ path is flagged as incomplete. If a wavelength on the segment A–C is found, a search for a wavelength for segment C to Z begins.

RPM selected the $4^{th}$ path as the best path for the 2 regenerators set. From FIG. 5B, it can be seen that the $4^{th}$ path requires a regenerator at flexibility points C and D. Segment A–C has 3000 km, so the search for a wavelength begins again in G3. As in the previous case, if no wavelength is found then group G2 is considered. If no wavelength can be found for segments A–C, C–D and D–Z, the $4^{th}$ path is flagged as incomplete. If a wavelength for segment A–C is found, then a search for a wavelength for segment C–D begins in group G2, and if this is successful, a search begins for a wavelength for segment D–Z in group G1 (D to Z is 500 km), until a wavelength set is found for the entire path, when the set is stored against the path data, step 97. If a wavelength set is not found for the respective regenerator path, branch NO of decision block 110, steps 95, 96 are performed and module 36 attempts to find a wavelength set for the next regenerator path.

As also seen in FIG. 5B the only path with 3 regenerators is the $5^{th}$ path. As in the previous cases, the search starts with the first segment A–B and in the most desirable group, which is G2, with the second segment B–C in G1, for the third segment C–D in G2 and for the last link in G1. Same rule as above apply. If no wavelength can be found for segments A–B, B–C, C–D or D–Z, then the $5^{th}$ regenerator path is flagged as incomplete, step 95.

Figure 9:
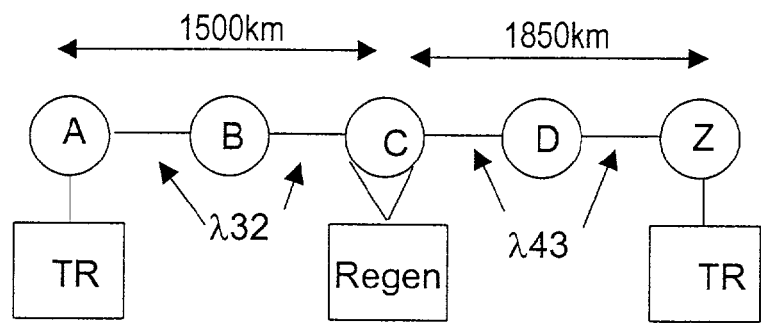
FIG. 9 illustrates upgrading wavelengths selection.

For the 0 and 1 regenerator path sets (k=0,1), wavelength upgrades may be provided for each segment of the path, as shown in step 99. FIG. 9 illustrates the concept of wavelength upgrades. As shown in the above table, $\lambda 32$ and $\lambda 43$ are correct suggested wavelengths for the given distances and link loading. I.e. $\lambda 32$ is suitable for section A–C which has 1500 km, and $\lambda 42$ is suitable for section C–Z which has 1850 km. However, on setup, either or both fail. The solution is to upgrade the wavelengths rather than adding a regenerator, since a wavelength upgrade has a much lower cost.

Let's assume that wavelengths $\lambda 42$ and $\lambda 44$ are available for upgrade, step 99. Chances are that the path can be set-up if $\lambda 32$ is upgraded to $\lambda 42$, which falls the >2000 km section of the table, as shown in step 110. However, no benefit can be obtained if $\lambda 43$ is upgraded since this already falls within the >2000 km section of the table. Hence, in the example shown in FIG. 9, there is only one choice for a wavelength upgrade path, which is to upgrade the section A–C. There are three combinations for a one regenerator path for the segment, 8 upgrades combinations for 2 regenerator paths, 16 for 3 regenerator paths, etc. A selection is preferably made based on cost, step 111.

If however no upgrade set can be find, module 36 flags the regenerator path accordingly and begins assigning wavelengths to the next regenerator paths, step 110 and the module 36 attempts to find a wavelength set for the next regenerator path. For k>2, a wavelength upgrade is only provided for the weakest segment along the path, where the weakest segment is defined as the segment with the lowest Q value.

Once module 36 has determined that all regenerator paths were allocated appropriate $\lambda$-sets, step 112, the completed regenerator paths are returned to the regenerator placement module, step 66 in FIG. 4B, for path selection. If not, module 36 continues assigning $\lambda$-sets to the remaining regenerator paths.

Numerous other embodiments of the invention may be envisaged without departing from the scope of the invention, as defined by the claims.

We claim:

1. A method for automatically routing and switching a connection in a WDM network, comprising:
   receiving a request for connecting a source node and a destination node;
   engineering a plurality of routes between said source and destination nodes, based on constraints in said request and on current network configuration and loading, wherein each route is capable of carrying a signal from the source to the destination node, said engineering further comprising;
   constructing 'n' valid link routes for connecting said source node and said destination node based on constraints in said request and on the current network configuration;
   for each valid link path, configuring 'm' groups of routes corresponding to a respective associated link path based on current regenerator availability data and operational parameters of said regenerators, wherein 'n' and 'm' are selected for said WDM networks,
   said configuring further comprising constructing a plurality of routes including a regenerator at (k) nodes along said associated link path, wherein k is an integer between 0 and the number of links along said associated link path, and grouping said routes according to the number 'k' of regenerators; and
   selecting a best route from said plurality of regenerator routes to serve said connection.

2. A method as claimed in claim 1, wherein said step of selecting comprises sorting said routes based on an estimated performance parameter.

3. A method as claimed in claim 2, wherein said estimated performance parameter is one of an estimated Q, a cost function and both an estimated Q and a cost function, where Q indicates a signal quality related to network topology and characteristics.

4. A method as claimed in claim 2, wherein said step of sorting said routes comprises:
   ordering said routes in a matrix according to the number of regenerators; and
   determining said estimated performance parameter of each said route in said matrix in a specific sequence, using an estimating tool.

5. A method as claimed in claim 4, wherein said specific sequence comprises:
   estimating said performance parameter for each route in said matrix in order, beginning with a route with no regenerators; and
   declaring a route having said estimated performance parameter above a threshold as said best route.

6. A method as claimed in claim 5, wherein said specific sequence is selected according to a probability of success function.

7. A method as claimed in claim 1, wherein said step of constructing 'n' valid link paths comprises:
   constructing a path search tree comprising all link paths that originate at said source node and sink into said destination node, starting from said source node; and
   for each link path, calculating a path weight and selecting said valid link paths according to said path weight.

8. A method as claimed in claim 7, further comprising interrupting construction of said path search tree when 'n' said valid paths have been selected.

9. A method as claimed in claim 7, further comprising abandoning a link path whenever a link on said link path is incompatible with a target link weight.

10. A method as claimed in claim 7, wherein said path weight is a path cost function.

11. A method as claimed in claim 10, wherein said path cost function comprises the cost of said source node, the cost of said destination node, the estimated cost of all regenerators switched in said valid link path, and the sum of link weights for all links of said valid link path.

12. A method as claimed in claim 1, wherein said constraints include: specific nodes that must be in a link path, specific nodes that must not be in a link path, specific links that must be in a link path, specific links that must not be in a link path, a link path that must be avoided, and a link path that must be followed.

13. A method as claimed in claim 1, comprising, for the case when 'n' valid link paths cannot be constructed, processing as many valid link paths as could be constructed.

14. A method as claimed in claim 1, wherein said step of constructing a plurality of routes comprises:
constructing a regenerator search tree for said associated link path, comprising all combinations of regenerator placement at intermediated nodes;
(a) abandoning a route whenever the length of the link between said source node and a next node in said associated link path is beyond the reach of all available transponders at said source node;
(b) abandoning a route whenever the length of a link between any intermediate node and the next node along said associated link path is beyond the reach of all available regenerators at said intermediate node;
(c) abandoning a route whenever a connection cannot be established between a last intermediate node and said destination node; and
(d) storing all routes other than said routes abandoned at (a), (b) and (c).

15. A method as claimed in claim 1, wherein said step of configuring comprises:
constructing a regenerator search tree for said associated link path, comprising all combinations of regenerator placement at intermediated nodes; and
storing a plurality of routes obtained by applying regenerator placement rules to said search tree; and
assigning a set of wavelengths to each said route based on wavelength rules and on current network loading data.

16. A method as claimed in claim 15, wherein said set of wavelengths comprises a wavelength for each segment of between two consecutive regenerators.

17. The method as claimed in claim 1 further comprising:
maintaining updated information on status and operation parameters of a bank of wavelength-converter/regenerator devices connected in stand-by at a plurality of switching nodes of said WDM network; and
switching one or more of said devices into a constructed route.

18. The method as claimed in claim 1, wherein said step of selecting comprises estimating an end-to-end performance parameter for each route and ordering said viable routes according to said performance parameter.

19. A method for automatically routing and switching a connection in a WDM network, comprising:
engineering a plurality of routes between a source and a destination node, based on user constraints, current network configuration and on regenerator placement rules, wherein each route is capable of carrying a signal from the source to the destination node;
assigning a set of wavelengths to each said route based on wavelength rules and on current network loading;
selecting a best route from said plurality of regenerator routes to serve said connection;
attempting to setup said connection along said best route by turning on said route based on a slow turn-on procedure for reducing transience in the network and allowing performance data collection for all established link paths that share a link with said best route;
once said route is on, measuring the end-to-end performance parameter of said route and comparing same with a margin threshold; and
exchanging traffic between said source and destination nodes if said performance parameter is over said margin threshold.

20. A method as claimed in claim 19, further comprising abandoning said route if said performance parameter is under said threshold.

21. A method as claimed in claim 19, further comprising changing a wavelength of said set with an upgraded wavelength if said performance parameter is under said threshold and attempting again to setup said connection.

22. A method as claimed in claim 19, further comprising switching an additional regenerator in said route wavelength if said performance parameter is under said threshold and attempting again to setup said connection.

23. A method as claimed in claim 19, further comprising monitoring said performance parameter of all paths that share a link with said best route, during said step of turning on said best route.

24. A routing manager for a photonic WDM network comprising:
a routing module (RM) for constructing 'n' different valid link paths between a source and a destination node based on constraints included in a request to establish a connection between said source node and destination node;
a regenerator placement module (RPM) for (i) engineering 'm' groups of routes for each said link path corresponding to a respective associated link path based on current regenerator availability data and operational parameters of said regenerators, each said group having 'k' regenerators, (ii) constructing a plurality of routes including a regenerator at (k) nodes along associated link paths, wherein k is an integer between 0 and the number of links along an associated link path, and (iii) grouping said routes according to the number 'k' of regenerators;
a wavelength assignment module WAM for assigning a set of wavelengths to each route; and
a control unit for receiving the request and managing operation of said RM, said RPM and said WAM for selecting a best route available for said connection.

25. A routing manager as claimed in claim 24 wherein said RM constructs a path search tree based on node and connectivity data received from a topology database.

26. A routing manager as claimed in claim 25 wherein said RM constructs a path search tree based on the constraints included in said request and received from said control unit.

27. A routing manager as claimed in claim 26, wherein said constraints comprises user defined performance and cost constraints.

28. A routing manager as claimed in claim 24 wherein said RPM constructs said regenerator search tree also based on user defined performance and cost constraints from said request.

29. A routing manager as claimed in claim 24, wherein said RPM estimates performance of all said routes using a Q calculator, where Q indicates a signal quality related to network topology and characteristics.

30. A routing manager as claimed in claim 24, wherein said WAM provides a set of wavelengths based on wavelengths rules, and user defined performance and cost constraints.

* * * * *